P. C. OSTEEN.
AUTOGRAPHIC CAMERA.
APPLICATION FILED FEB. 5, 1915.

1,251,915.

Patented Jan. 1, 1918.
2 SHEETS—SHEET 1.

Witnesses
J. A. Ryan
Chas Seebold

Inventor
P. C. Osteen
By ___ Attorney

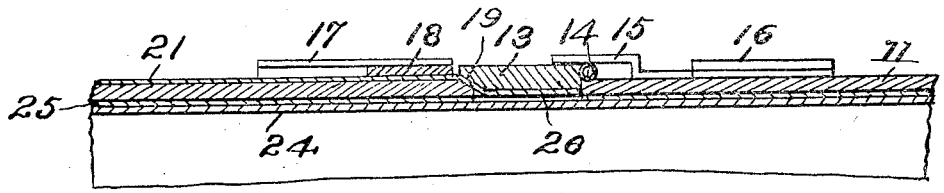
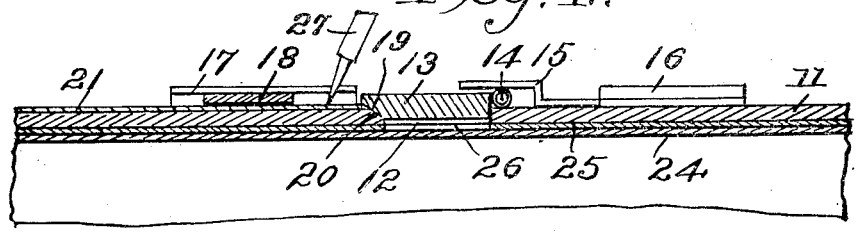
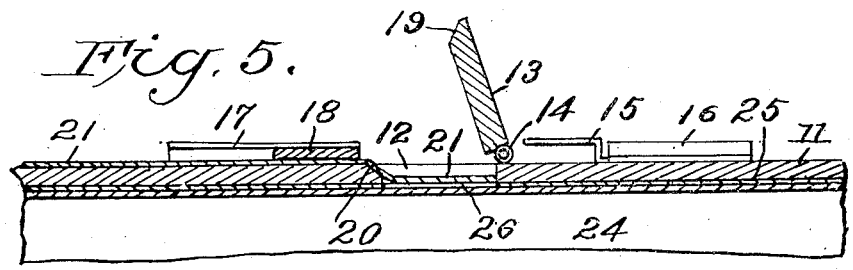
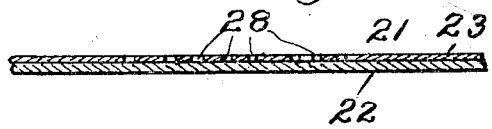
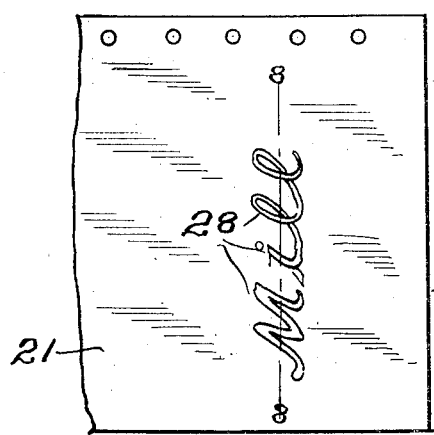

UNITED STATES PATENT OFFICE.

PERCY C. OSTEEN, OF ANDERSON, SOUTH CAROLINA.

AUTOGRAPHIC CAMERA.

1,251,915.   Specification of Letters Patent.   Patented Jan. 1, 1918.

Application filed February 5, 1915. Serial No. 6,319.

*To all whom it may concern:*

Be it known that I, PERCY C. OSTEEN, citizen of the United States of America, residing at Anderson, in the county of Anderson and State of South Carolina, have invented certain new and useful Improvements in Autographic Cameras; and I do hereby declare the following to be a full, clear, and exact description of the invention, such as will enable others skilled in the art to which it appertains to make and use the same.

This invention relates to cameras, and more particularly to a modern type known as the "autographic" camera, in which means is provided whereby a permanent record in writing may be made on each negative at the time the exposure is made.

The invention has for its object to provide a camera and a roll film therefor having a plurality of spaced transversely elongated openings in the backing strip adapted to be successively moved into registration with an opening formed in the camera back and a writing sheet adjustably secured to the camera and movable into the opening.

Another object is the provision of an "autographic" camera having an opening in the back thereof, a hinged door or closure for the opening, and a writing sheet slidably secured to the camera back and movable under the free edge of the door, when the latter is closed, into the opening.

With these and other objects in view, the invention consists in the novel construction, arrangement and formation of parts as will be hereinafter specifically described, claimed and illustrated in the accompanying drawing, in which:

Fig. 3 represents a transverse sectional view on the line 3—3 of Fig. 2.

Fig. 4 represents a sectional view similar to Fig. 3, illustrating the slide adjusted so as to expose a portion of the writing sheet adjacent the hinged closure or door.

Fig. 5 represents a sectional view similar to Figs. 3 and 4, illustrating the hinged door or closure in open position.

Fig. 7 represents a fragmental top plan view of the writing sheet removed.

Fig. 8 represents a transverse sectional view on the line 8—8 of Fig. 7.

Figure 1:
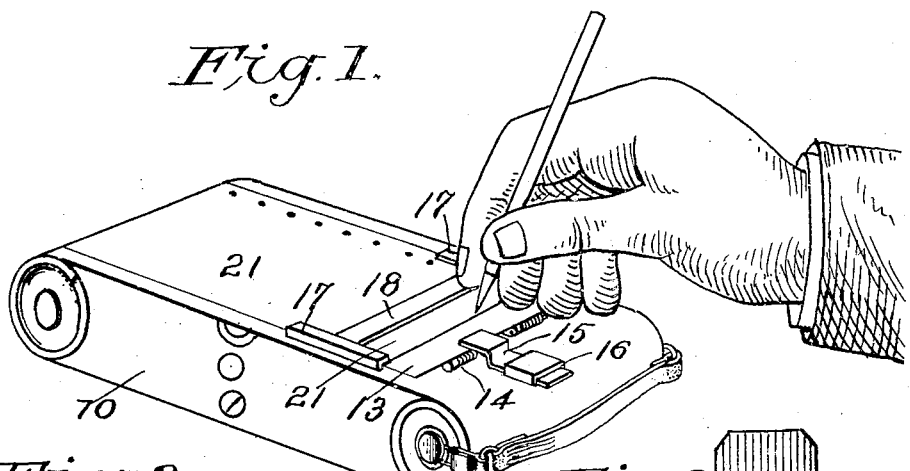
Figure 1 represents a perspective view of the improved "autographic" camera.
Figure 2:
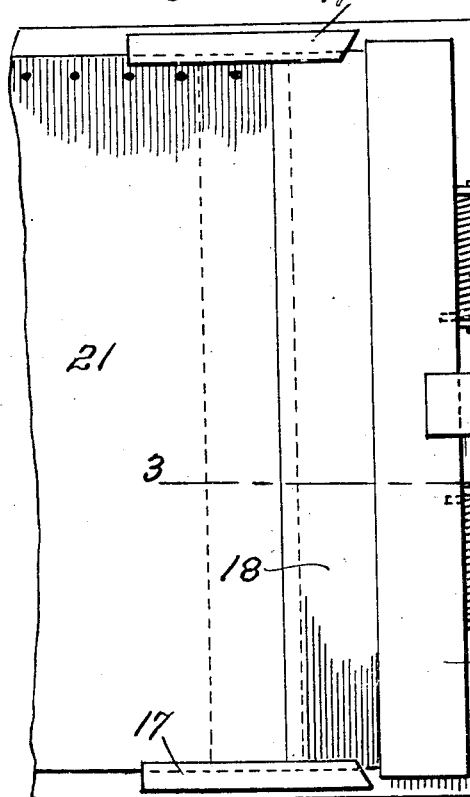
Fig. 2 represents a fragmental rear elevation thereof.
Figure 6:
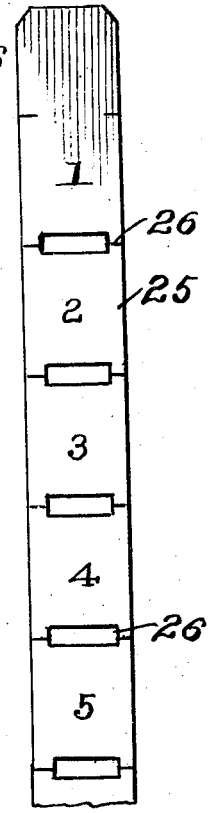
Fig. 6 represents a fragmental plan view of the film backing sheet or strip.

Referring to the drawing in detail, wherein similar reference numerals designate corresponding parts throughout the several views, the numeral 10 indicates generally the body or box of a film camera of ordinary construction, in the opposite ends of which are arranged film spool supports (not shown). The back 11 of the body is formed with an elongated opening 12 adapted to be closed by a spring actuated light-proof closure 13, hingedly secured at 14 to the camera back 11 and adapted to be reliably secured in closed position by an angular slidable stop 15 mounted in a suitable holder 16. A pair of spaced guides 17 are secured in spaced relation adjacent the opposite longitudinal edges of the camera back 11 and receive a slidable plate 18 movable against the longitudinal edge of the light-proof closure 13. The free longitudinal edge 19 of the closure 13 is beveled and adapted to snugly engage the correspondingly shaped edge or wall 20 of the opening 12.

A writing sheet designated generally by the numeral 21 is positioned against the camera back 11, exteriorly of the latter, and is slidably engaged between the guides 17 under the slidable plate 18. The writing sheet 21 comprises a body 22 formed of a sheet of flexible or elastic transparent material, such as celluloid and a coating 23 of opaque material applied to the writing surface of the body sheet 22. The width of the writing sheet 21 corresponds approximately to the length of the opening 12 and is adapted to be inserted into the opening between the beveled edges 19 and 20 of the door 13 and opening 12, respectively. The photographic film 24 is wound, as usual, upon the film spools (not shown) and is movable behind the exposure opening in the camera body 10. A backing sheet 25 is wound upon the spools with the film 24 and is interposed between the film and the back 11 of the camera. The backing 25 is formed of a suitable opaque material, such as black paper, and is formed at spaced intervals with transversely elongated openings 26 adapted to be brought into registration with the opening 12 in the camera back and as the film 24 is rolled or wound upon the receiving spool to bring the sections of the film successively behind the exposure opening in the camera for exposure.

In use, the film is positioned within the camera in the usual manner and a portion of the backing 25 is wound upon the receiving spool until the first section of the film 24, which latter is secured at its ends to the back 25, is brought into position behind the exposure opening. With the film in this position the first or number 1 opening 26 is in registration with the opening 12 in the camera back, and it will be understood that the opening 12 is closed, to prevent entrance of light into the camera by the stop 15. The exposure is made in the usual manner, and subsequently the plate 18 is slid from the position illustrated in Fig. 3 to that illustrated in Fig. 4, thus leaving a portion of the writing strip 21 between the plate 18 and the door 13 exposed. A pencil 27 or other sharp pointed instrument is engaged upon the opaque coating 13 and the desired notation 28 is made on the portion thereof exposed between the plate 18 and the door 13. The movement of the pencil or sharp pointed instrument over the relatively soft opaque coating 23 forms a groove in the latter following the path of the point of the instrument over the coating, and when the writing sheet is subsequently moved longitudinally between the door 13 and the beveled edge or wall 20 of the opening 12 into the latter, as illustrated in Fig. 5, the door 13 is opened and light is admitted through the marking or writing 28 causing a photographic impression of the writing to be made directly upon the film 24 intermediate the exposed sections thereof. As light is admitted directly to the film the exposure need be made for merely the fractional part of a second, thus a swift opening and closing of the door suffices to make the desired photographic impression upon the film of the writing 28 made upon the writing sheet.

What I claim is:

1. In an autographic camera, a body having an opening and in the back thereof, a closure for said opening, and a plate slidably secured to said body and arranged laterally of said opening, a pair of guides secured to the camera back, and a writing sheet including a transparent body and an opaque coating thereon slidably engaged between said guides and movable under said closure and into said opening.

2. In an autographic camera, a body having an opening in the back thereof, a closure for said opening, a pair of guides secured to said back, a transparent writing sheet slidably mounted in said guide, a removable opaque coating on the writing surface of said writing sheet, said writing sheet being movable under said closure and into said opening, and a plate slidably mounted in said guides and movable against said closure, and a plate slidably secured to said body and arranged laterally of said opening.

3. In an autographic camera, a body having an opening in the back thereof, a film movably disposed in said body, a backing strip interposed between said film and the back of said camera and having a plurality of transverse openings adapted to be successively moved into registration with the opening in the camera back, a closure for said opening, a writing sheet slidably secured to the exterior surface of the camera back and including a transparent body sheet, and an opaque coating on the writing surface thereof, said writing sheet being movable under said closure and into the opening in said camera back.

4. In an autographic camera, a body having an opening in the back thereof, a film movably disposed in said body, a backing strip interposed between said film and the back of said body and having a plurality of transverse openings adapted to be successively moved into registration with the opening in the camera back, a closure for said opening, a plate slidably secured to said body and movable against said closure, a writing sheet slidably secured to the exterior surface of the camera back and including a transparent body sheet, and an opaque coating on the writing surface thereof, said writing sheet being movable under said closure and plate and into the opening in the camera back.

In testimony whereof I affix my signature in presence of two witnesses.

PERCY C. OSTEEN.

Witnesses:
W. N. WEBB,
C. A. BASKIN.

Copies of this patent may be obtained for five cents each, by addressing the "Commissioner of Patents, Washington, D. C."